United States Patent
Horii et al.

(10) Patent No.: US 6,246,281 B1
(45) Date of Patent: Jun. 12, 2001

(54) ABSOLUTE PHASING CIRCUIT

(75) Inventors: Akihiro Horii, Zama; Kenichi Shiraishi, Yokohama, both of (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/445,213

(22) PCT Filed: Jun. 15, 1998

(86) PCT No.: PCT/JP98/02618

§ 371 Date: Dec. 6, 1999

§ 102(e) Date: Dec. 6, 1999

(87) PCT Pub. No.: WO98/57471

PCT Pub. Date: Dec. 17, 1998

(30) Foreign Application Priority Data

Jun. 13, 1997 (JP) .................................................... 9-171185

(51) Int. Cl.[7] .................................................... H04L 27/22
(52) U.S. Cl. .......................... 329/304; 329/310; 375/332; 375/371
(58) Field of Search ................... 329/304, 310; 375/329, 332, 371

(56) References Cited

U.S. PATENT DOCUMENTS

| | | | |
|---|---|---|---|
| 5,025,455 | * | 6/1991 | Nguyen ................. 329/304 |
| 5,287,067 | * | 2/1994 | Denno et al. ............ 329/304 |

FOREIGN PATENT DOCUMENTS

| | | |
|---|---|---|
| 58-178653 | 10/1983 | (JP) . |
| 62-216557 | 9/1987 | (JP) . |
| 4-334238 | 11/1992 | (JP) . |
| 6-112985 | 4/1994 | (JP) . |
| 6-120995 | 4/1994 | (JP) . |
| 6-205055 | 7/1994 | (JP) . |
| 6-276239 | 9/1994 | (JP) . |
| 7-297870 | 11/1995 | (JP) . |
| 10-056486 | 2/1998 | (JP) . |

* cited by examiner

*Primary Examiner*—Siegfried H. Grimm
(74) *Attorney, Agent, or Firm*—Eric J. Robinson; Nixon Peabody LLP

(57) ABSTRACT

An absolute phasing circuit having a simplified phase rotating means constituting a remapper. The phase rotation angle of a receiving phase for the signal point arrangement on the transmitting side is detected, and a phase rotation signal RT (3) based on the detected phase rotation angle is outputted from a frame synchronization circuit (2). Phases of baseband demodulated signals I and Q through a demodulator circuit (1) are rotated by 45° through a ROM (3) constituting the remapper. A logic conversion circuit (4), receiving the baseband demodulated signals I and Q through the demodulator circuit (1) and phase rotated baseband demodulated signals i and q from the ROM (3), performs inversion of code and exchange of the baseband demodulated signals selectively and delivers a baseband demodulated signal matched with the signal point arrangement on the transmitting side. The circuitry is simplified because the ROM (3) is simply required to rotate the phase of the baseband demodulated signals I and Q through the demodulator circuit (1) by, for example, 45°.

2 Claims, 5 Drawing Sheets

FIG. 2A

| θ | RT(3) | I' | Q' |
|---|---|---|---|
| 0° | "000" | I | Q |
| 90° | "010" | Q | -I |
| 180° | "100" | -I | -Q |
| 270° | "110" | -Q | I |

FIG. 2B

| θ | RT(3) | I' | Q' |
|---|---|---|---|
| 45° | "001" | i | q |
| 135° | "011" | q | -i |
| 225° | "101" | -i | -q |
| 315° | "111" | -q | i |

FIG.3A

| θ | RT(3) | I' | Q' |
|---|---|---|---|
| 45° | "001" | -q | i |
| 135° | "011" | i | q |
| 225° | "101" | q | -i |
| 315° | "111" | -i | -q |

FIG.3B

| θ | RT(3) | I' | Q' |
|---|---|---|---|
| 45° | "001" | -i | -q |
| 135° | "011" | -q | i |
| 225° | "101" | i | q |
| 315° | "111" | q | -i |

FIG.3C

| θ | RT(3) | I' | Q' |
|---|---|---|---|
| 45° | "001" | q | -i |
| 135° | "011" | -i | -q |
| 225° | "101" | -q | i |
| 315° | "111" | i | q | ial point arrangement on the receiving side is compared
ABSOLUTE PHASING CIRCUIT

TECHNICAL FIELD

The present invention relates to an absolute phasing circuit for making the phase of a demodulated signal of a received phase shift keying modulated signal be coincident with the phase of the modulated signal on the transmitting side by correcting the phase rotation of the demodulated signal.

BACKGROUND RELATED ART

A conventional absolute phasing circuit of a satellite digital broadcasting receiver is shown in FIG. 4. In a conventional absolute phasing circuit, a demodulation circuit 1 receives an intermediate frequency (IF) signal converted into a predetermined frequency from, for example, a received eight-phase shift keying modulated signal. The demodulation circuit 1 demodulates the received IF signal, for example, into baseband demodulation signals I(8) and Q(8) of the quantization bit number of 8 (in this specification, the numeral in ( ) such as I(8) and Q(8) represents the number of bits. If there is no confusion, they are written simply as I and Q where applicable). Upon reception of the baseband demodulation signals I(8) and Q(8), a frame synchronization circuit 2 captures a frame synchronization signal which is a known bit stream to output a frame synchronization pulse. At the same time, the frame synchronization circuit 2 compares the signal point arrangement of the captured frame synchronization signal with the original signal point arrangement on the transmitting side to obtain the present reception phase and output a phase rotation signal RT(3) ="XYZ". In this case, the phase rotation signal RT(3) has three bits because of the eight-phase shift keying modulation.

There are eight reception phases each shifted by 45° in the case of the eight-phase shift keying modulation. The phase rotation signal RT(3) indicates a phase difference between the signal arrangement on the transmitting side and the signal point arrangement on the receiving side. RT(3) is supplied as an address signal to a ROM 31 which constitutes a remapper. The baseband demodulation signals I(8) and Q(8) are reversely rotated by an amount corresponding to the phase difference to obtain absolute phased baseband demodulation signals I'(8) and Q'(8) (which are written simply as I' and Q' where applicable by omitting the numbers of bits).

In this specification, phase rotation of signal point arrangement on the receiving side is called remapping, and the remapper means a phase rotation circuit which performs remapping.

Next, remapping will be described with reference to FIG. 5. FIG. 5(a) shows signal point arrangement for eight-phase shift keying modulation. With the eight-phase shift keying modulation, a digital signal (abc) of three bits can be transmitted by using one symbol. There are eight combinations of symbols, including (000) (001), ... , (111). Each of these symbols is converted into one of signal points 0 to 7 on the vector plane of I- and Q-axes shown in FIG. 5(a).

It is assumed herein that the symbol length of the frame synchronization signal used on the transmitting side is "16" and that the pattern of the frame synchronization signal is a fixed converted pattern which appears at the signal points "0" and "4" shown in FIG. 5(a) at the same probability and is received by the frame synchronization circuit 2 of the receiver.

The frame synchronization circuit 2 of the receiver shown in FIG. 4 captures the frame synchronization signal, and the signal point arrangement on the receiving side is compared with that of the transmitting side. In this case, depending upon the phase of the carrier reproduced by the demodulation circuit 1 of the receiver, the frame synchronization circuit 2 captures the frame synchronization signal constituted of the signal point arrangement "0" and "4" shown in FIG. 5(a) same as that on the transmitting side, of the signal point arrangement "1" and "5", of the signal point arrangement "2" and "6", of the signal point arrangement "3" and "7", or any one of the inverted signal point arrangements of those four frame synchronization signals described above, totaling in eight signal point arrangements. It cannot be known at which phase the frame synchronization signal is captured.

However, by monitoring the signal point arrangement of the captured frame synchronization signal, it is possible to estimate at which phase the frame synchronization signal was captured, i.e., at which phase the baseband demodulation signals I and Q were demodulated. Basing upon the estimated reception phase difference, ROM 31 as the remapper outputs the baseband demodulation signals I' and Q' in the following manner.

It is assumed for example that the receiver captures the frame synchronization signal constituted of the signal point arrangement of "0" and "4" shown in FIG. 5(a). In this case, since the signal point arrangement on the receiving side is the same as that on the transmitting side, it is not necessary to perform the remapping. Therefore, the frame synchronization circuit out puts the phase rotation signal RT(3) ="000", and ROM 31 outputs I' =I and Q'=Q.

If the receiver captures the frame synchronization signal constituted of the signal point arrangement of "1" and "5" shown in FIG. 5(b), it means that the frame synchronization signal constituted of the signal point arrangement of "0" and "4" and transmitted from the transmitting side was received after the phase rotation of 45° in the counter-clockwise direction, i.e., at the reception phase rotation of θ=45°. In order to obtain an absolute phase same as that of the signal point arrangement on the transmitting side, it is therefore necessary to rotate the phase of the reception signal by 45° in the clockwise direction. Namely, the phase of the signal received at "1" in FIG. 5(b) is rotated to "0" and the phase of the signal received at "5" in FIG. 5(b) is rotated to "4".

This reverse phase rotation is performed by ROM 31 as the remapper. A parameter representing the phase rotation angle corresponds to the phase rotation signal RT(3) shown in FIG. 4. The value of the phase rotation signal RT(3) is defined by the following equation (1):

$$RT(3)=\theta/45 \qquad (1)$$

where θ=n·45° and n is an integer of 0 to 7.

If the signal is received at θ=45°, the phases of the baseband demodulation signals I and Q are rotated by −45° (=−θ=φ) to obtain the absolute phase. Using the equation (1), the frame synchronization circuit outputs RT(3)="001". Upon reception of RT(3), ROM 31 as the remapper rotates the input baseband demodulation signals I and Q by an angle φ by the following equations (2) and (3) in the case of the eight-phase shift keying modulation:

$$I'=I \cos(\phi)-Q \sin(\phi) \qquad (2)$$

$$Q'=I \sin(\phi)-Q \cos(\phi) \qquad (3)$$

Similarly, if the reception rotation angle θ is 90°, 135°, 180°, ... , or 315°, the frame synchronization circuit outputs RT(3)="010 ", "011 ", "100", ... , or "111", and ROM 31 as the remapper performs the phase conversion by using the equations (1), (2) and (3) to obtain the absolute phased baseband demodulation signals I' and Q'.

PROBLEMS TO BE SOLVED BY THE INVENTION

The conventional absolute phasing circuit is, however, associated with the problem that a capacity of ROM constituting the remapper becomes large. The capacity necessary for ROM depends upon the number of quantization bits of the baseband demodulation signals I and Q. If the number of quantization bits of the baseband demodulation signals I and Q is 8 bits, 19 (=3 +8 +8) addresses are required. Therefore, the capacity of ROM constituting the remapper becomes as large as $2^{19} \times 16$.

SUMMARY OF THE INVENTION

The object of the present invention is to provide an absolute phasing circuit having a simple phase rotating means constituting a remapper.

The absolute phasing circuit of this invention comprises: a frame synchronization circuit for comparing a signal point arrangement of baseband demodulation signals I and Q demodulated from a received P-phase shift keying modulated signal by a demodulation circuit with an original signal point arrangement on a transmitting side, detecting a phase rotation angle of the reception phase relative to the original signal point arrangement, and outputting a phase rotation signal corresponding to the detected phase rotation angle; phase rotation means for rotating a phase of the baseband demodulation signals I and Q demodulated by the demodulation circuit by an amount corresponding to an odd multiple of ($2\pi/P$) radian; and logic conversion means for receiving the baseband demodulation signals I and Q demodulated by the demodulation circuit and phase rotated baseband demodulation signals i and q output from the phase rotation means, selectively converting the baseband demodulation signals in accordance with the phase rotation signal, and outputting baseband demodulation signals having a signal point arrangement same as the signal point arrangement on the transmitting side.

According to the absolute phasing circuit of this invention, the frame synchronization circuit detects a phase rotation angle of the reception phase relative to the signal point arrangement on the transmitting side and outputs a phase rotation signal corresponding to the detected phase rotation angle. The phase rotation means rotates a phase of the baseband demodulation signals I and Q demodulated by the demodulation circuit by an odd multiple of $2\pi/P$ radian. The logic conversion means receives the baseband demodulation signals I and Q demodulated by the demodulation circuit and the phase rotated baseband demodulation signals i and q output from the phase rotation means, selectively converting the baseband demodulation signals in accordance with the phase rotation signal, and outputs baseband demodulation signals having a signal point arrangement same as the signal point arrangement on the transmitting side. Accordingly, the absolute phasing circuit having a simple structure can be realized because it is sufficient that the phase rotation means rotates the phase of the baseband demodulation signals demodulated by the modulation circuit, for example, by an odd multiple of ($2\pi/P$) radian.

BRIEF DESCRIPTION OF THE DRAWINGS

FIGS. 2A and 2B show truth tables of a logic conversion circuit of the absolute phasing circuit of the embodiment.

FIGS. 3A, 3B, and 3C show truth tables of a logic conversion circuit of the absolute phasing circuit of the embodiment.

EMBODIMENTS OF THE INVENTION

Figure 1:
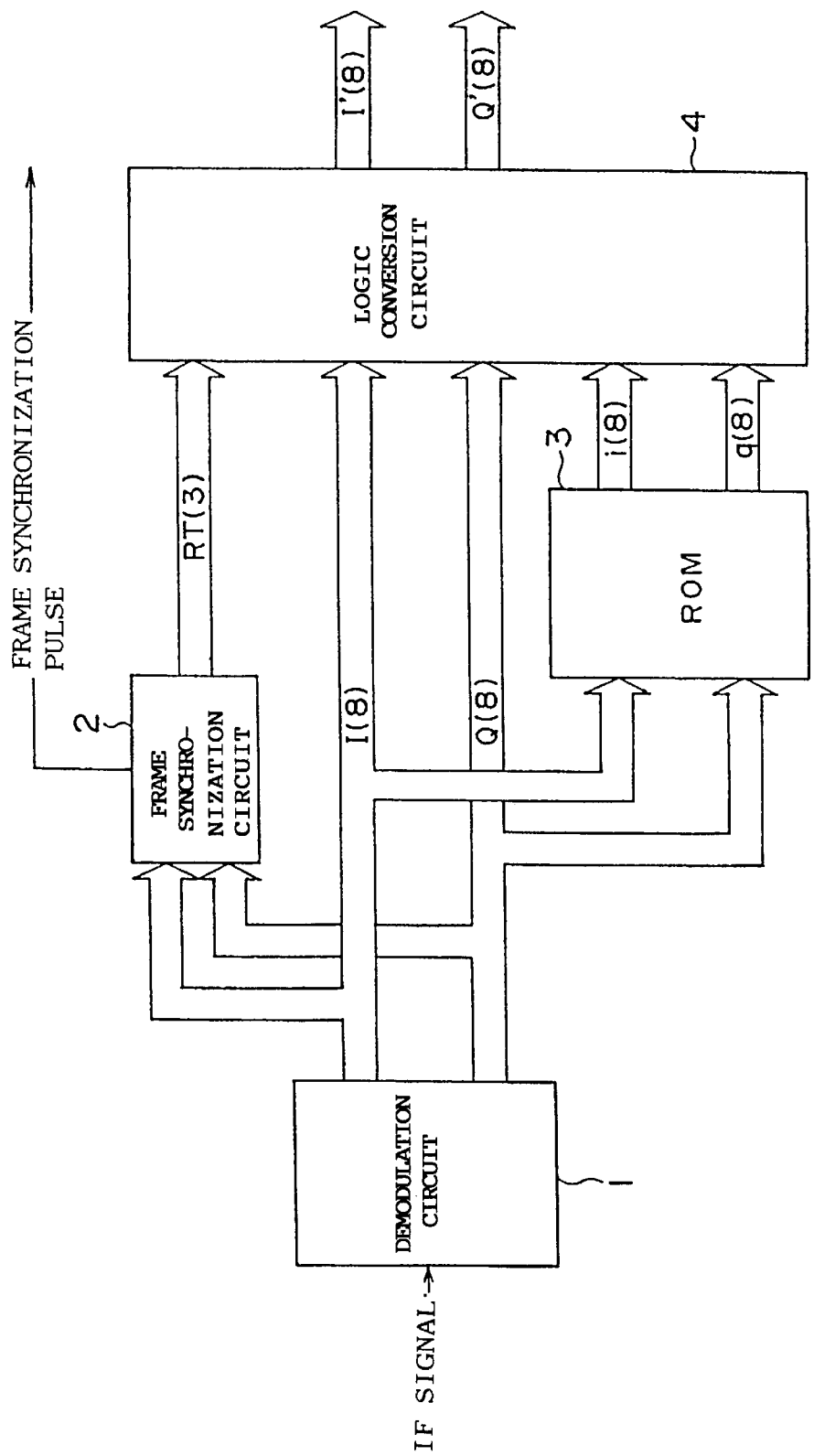
FIG. 1 is a block diagram showing the structure of an absolute phasing circuit according to an embodiment of the invention.
Figure 4:
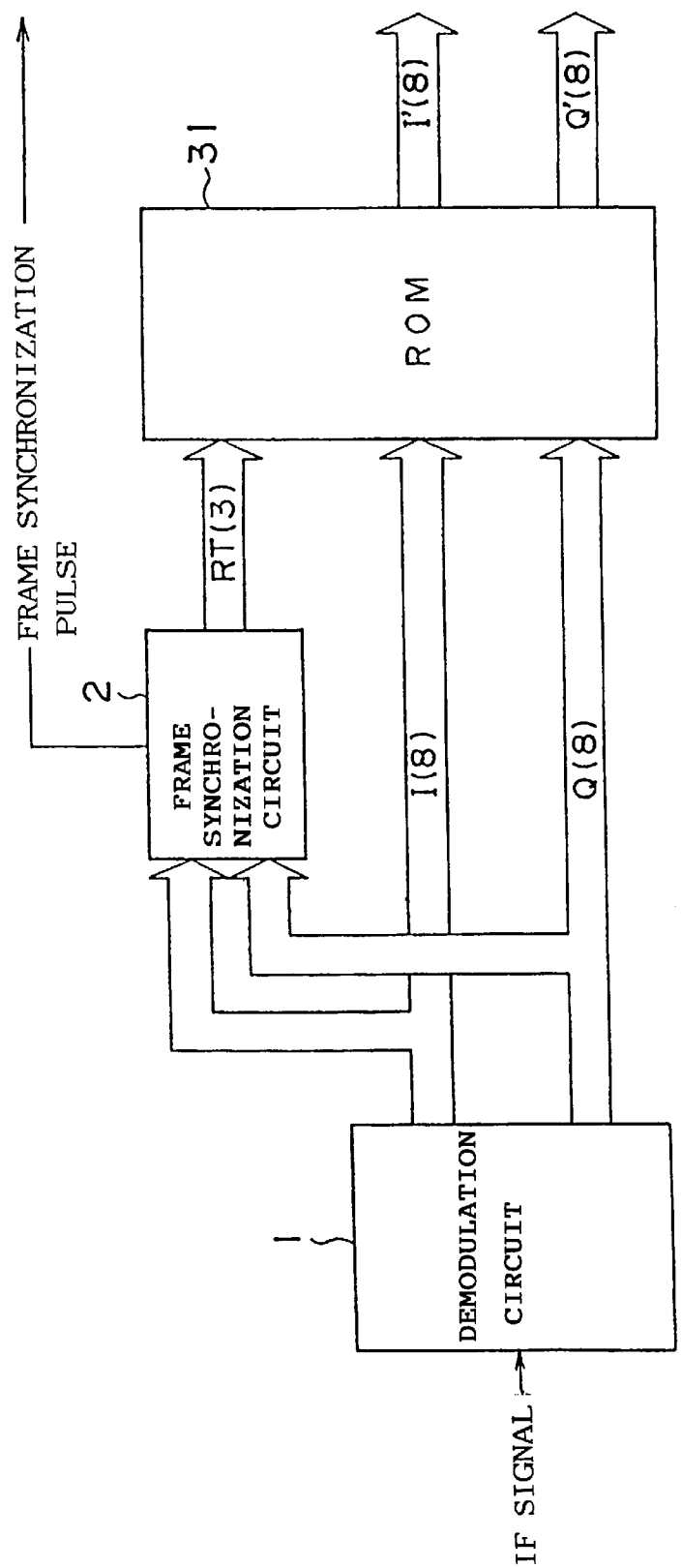
FIG. 4 is a block diagram showing the structure of a conventional absolute phasing circuit.
Figure 5A:
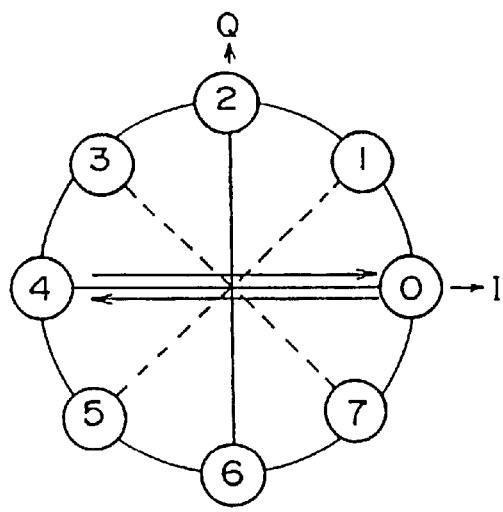
FIGS. 5A and 5B are diagrams showing signal point arrangements illustrating the operation of the absolute phasing circuit.
Figure 5B:
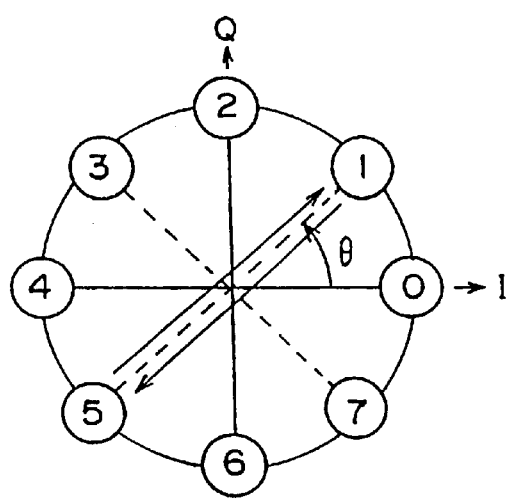

An absolute phasing circuit according to an embodiment of the invention will be described. FIG. 1 is a block diagram showing the structure of the absolute phasing circuit of the embodiment. In this embodiment, it is assumed that an eight-phase shift keying modulated signal is received.

In the absolute phasing circuit according to the embodiment of the invention, a demodulation circuit 1 receives an intermediate frequency signal converted into a predetermined frequency from a received eight-phase shift keying modulated signal (P=8=$2^3$). The demodulation circuit 1 demodulates the received signal into baseband demodulation signals I(8) and Q(8) of the quantization bit number of 8. Upon reception of the baseband demodulation signals I(8) and Q(8), a frame synchronization circuit 2 captures a frame synchronization signal which is a known bit stream to output a frame synchronization pulse. At the same time, the frame synchronization circuit 2 compares the signal point arrangement of the captured frame synchronization signal with the original signal point arrangement on the transmitting side to obtain the present reception phase and output a phase rotation signal RT(3)="XYZ".

The baseband demodulation signals I(8) and Q(8) demodulated by the demodulation circuit 1 are supplied to a ROM 3 which constitutes a remapper and outputs remapped baseband demodulation signals i(8) and q(8). ROM 3 corresponds to a phase rotation means.

A logic conversion circuit 4 receives the phase rotation signal RT(3), baseband demodulation signals I(8) and Q(8) demodulated by the demodulation circuit 1, and baseband demodulation signals i(8) and q(8) remapped by ROM 3, and performs a phase rotation to output absolute phased baseband demodulation signals i'(8) and q'(8).

First, the remapping to be performed by ROM 3 will be described. The phase rotation signal RT(3) input to ROM 31 is not input to ROM 3, but only the baseband demodulation signals I(8) and Q(8) demodulated by the demodulation circuit 1 are input to ROM 3 which in turn performs a phase rotation only for $\theta=2\pi/P=2\pi/8=45°$.

More specifically, $\phi=-\theta=-45°$ is substituted into the equations (2) and (3) to obtain the following equations (4) and (5) which are equal to the following equations (6) and (7):

$$i(8)=I \cos(-45°)-Q \sin(-45°) \quad (4)$$

$$q(8)=I \sin(-45°)+Q \cos(-45°) \quad (5)$$

$$i(8)=I(1/\sqrt{2})-Q(-1/\sqrt{2})=(1/\sqrt{2})(I+Q) \quad (6)$$

$$q(8)=I(-1/\sqrt{2})+Q(1/\sqrt{2})=(1/\sqrt{2})(-I+Q) \quad (7)$$

Therefore, ROM 3 remaps the input baseband demodulation signals I(8) and Q(8) into baseband demodulation signals whose phase was rotated by 45° in the clockwise direction.

Next, logic conversion by the logic conversion circuit 4 will be described, the logic conversion circuit 4 receiving the phase rotation signal RT(3), baseband demodulation signals I(8) and Q(8) demodulated by the demodulation circuit 1, and baseband demodulation signals i(8) and q(8) remapped by ROM 3. FIGS. 2(a) and 2(b) are truth tables illustrating the operation of the logic conversion circuit 4. The truth table shown in FIG. 2(a) corresponds to an even n, i.e., n=0, 2, 4 and 6, and the truth table shown in FIG. 2(b) corresponds to an odd n, i.e., n=1, 3, 5 and 7, where n=n·2π/P.

In the case of the even n, by using the truth table shown in FIG. 2(a), the input baseband demodulation signals I(8) and Q(8) are logically converted into the absolute phased baseband demodulation signals I'(8) and Q'(8) in accordance with the phase rotation signal RT(3).

For example, if the phase rotation signal RT(3) is "000", it means that the received signal has the absolute phase. Therefore, the baseband demodulation signal I'(8) is equal to the baseband modulation signal I(8), and the baseband demodulation signal Q'(8) is equal to the baseband modulation signal Q(8). If the phase rotation signal RT(3) is "010", it means that the phase rotation angle θ is 90°. Conventionally, the equations (2) and (3) are converted into the following equations (8) and (9):

$$I'=I \cos(-90°)-Q \sin(-90°)=Q(8) \quad (8)$$

$$Q'=I \sin(-90°)+Q \cos(-90°)=-I(8) \quad (9)$$

However, this conversion can be easily realized by inverting the sign of the baseband demodulation signal I(8) input to the logic conversion circuit 4 and exchanging the sign-inverted baseband demodulation signal I(8) and the baseband demodulation signal Q(8).

Similarly, the conversion can be realized by using the truth table of FIG. 2(a) for the phase rotation signal RT(3)= "100" and RT(3)="110".

In the case of the odd n, by using the truth table shown in FIG. 2(b), the input baseband demodulation signals i(8) and q(8) are logically converted into the absolute phased baseband demodulation signals I'(8) and Q'(8) in accordance with the phase rotation signal RT(3).

For example, if the phase rotation signal RT(3) is "001", it means that the phase rotation angle θ is 45°. Therefore, the baseband demodulation signal I'(8) is equal to the baseband modulation signal i(8), and the baseband demodulation signal Q'(8) is equal to the baseband modulation signal q(8). Therefore, the baseband demodulation signals i(8) and q(8) output from ROM 3 can be used directly as the baseband demodulation signals I'(8) and Q'(8).

If the phase rotation signal RT(3) is "011", it means that the phase rotation angle θ is 135°. In this case, the conversion is equal to that the baseband demodulation signals i(8) and q(8) rotated by the phase rotation angle θ=45° are further rotated by the phase rotation angle θ=90°. Therefore, this conversion is given by the following equations (10) and (11):

$$I'=i \cos(-90°)-q \sin(-90°)=q(8) \quad (10)$$

$$Q'=i \sin(-90°)+q \cos(-90°)=-i(8) \quad (11)$$

This conversion can be easily realized by inverting the sign of the baseband demodulation signal i(8) input to the logic conversion circuit 4 and exchanging the sign-inverted baseband demodulation signal i(8) and the baseband demodulation signal q(8). Similarly, the conversion can be realized by using the truth table of FIG. 2(b) for the phase rotation signal RT(3)="101" and RT(3)="111".

In the embodiment of the absolute phasing circuit of this invention, ROM 3 as the remapper performs a phase rotation of θ=45° by way of example. Instead, ROM 3 may perform a phase rotation of θ=135°, θ=225°, or θ=315°. In this case, the logic conversion by the logic conversion circuit 4 is performed in accordance with the truth tables shown in FIGS. 3(a) to 3(c) respectively for the phase rotation of θ=135°, θ=225°, and θ=315°.

In the absolute phasing circuit according to the embodiment of the invention, the capacity of ROM 3 constituting the remapper is only ⅛ of that of ROM 31. Also in the absolute phasing circuit according to the embodiment of the invention, although remapping through table conversion is performed by ROM 3, an adder and a multiplier for calculation the equations (6) and (7) may be used in place of ROM 3. In this case, the multiplier performs only a multiplication by a fixed value of ($\sqrt{1/2}$) so that the circuit scale can be made small.

As described so far, according to the absolute phasing circuit of this invention, if a ROM is used as the remapper or phase rotation means, the capacity of ROM can be reduced by ⅛ irrespective of the number of quantization bits of the baseband demodulation signals I and Q. Accordingly, the area of a chip on which the absolute phasing circuit is fabricated can be used effectively. If a calculation unit is used in place of ROM, the circuit scale of the calculation unit can be made small. Accordingly, the area of a chip on which the absolute phasing circuit is fabricated can be used effectively.

What is claimed is:

1. An absolute phasing circuit, comprising:

a frame synchronization circuit for comparing a signal point arrangement of baseband demodulation signals I and Q demodulated from a received P-phase shift keying modulated signal wherein P is n-th power of 2 and n is an integer of 3 or greater by a demodulation circuit with an original signal point arrangement on a transmitting side, detecting a phase rotation angle of the reception phase relative to the original signal point arrangement, and outputting a phase rotation signal corresponding to the detected phase rotation angle;

phase rotation means for rotating a phase of the baseband demodulation signals I and Q demodulated by the demodulation circuit by an amount corresponding to an odd multiple of (2π/P) radian; and logic conversion means for receiving the baseband demodulation signals I and Q demodulated by the demodulation circuit and phase rotated baseband demodulation signals i and q output from said phase rotation means, selectively converting the baseband demodulation signals in accordance with the phase rotation signal, and outputting baseband demodulation signals having a signal point arrangement same as the signal point arrangement on the transmitting side.

2. An absolute phasing circuit according to claim 1, wherein said logic conversion means performs a logic conversion by using the demodulation signals i and q if the detected phase rotation angle is an odd multiple of 2π/P, and performs a logic conversion using the phase rotated baseband demodulation signals I and Q if the detected phase rotation angle is an even multiple.

* * * * *